April 23, 1946.    H. L. BEEKLEY ET AL    2,398,775
VALVE
Filed Jan. 2, 1942    2 Sheets-Sheet 2

Inventors:
Henry L. Beekley,
Richard H. Gilbert,
Rollin H. Lacart,
By Chritton, Wiles, Davies & Hirschl, Attys.

Patented Apr. 23, 1946

2,398,775

UNITED STATES PATENT OFFICE 2,398,775

VALVE

Henry L. Beekley, Glen Ellyn, Richard H. Gilbert, Oak Park, and Rollin H. Lacart, Chicago, Ill., assignors to The Electrimatic Corporation, a corporation of Illinois Application January 2, 1942, Serial No. 425,469

3 Claims. (Cl. 137—139)

This invention relates to a valve, and more particularly to a valve adapted to control fluid under pressure and to be either manually or automatically actuated.

Figure 1:
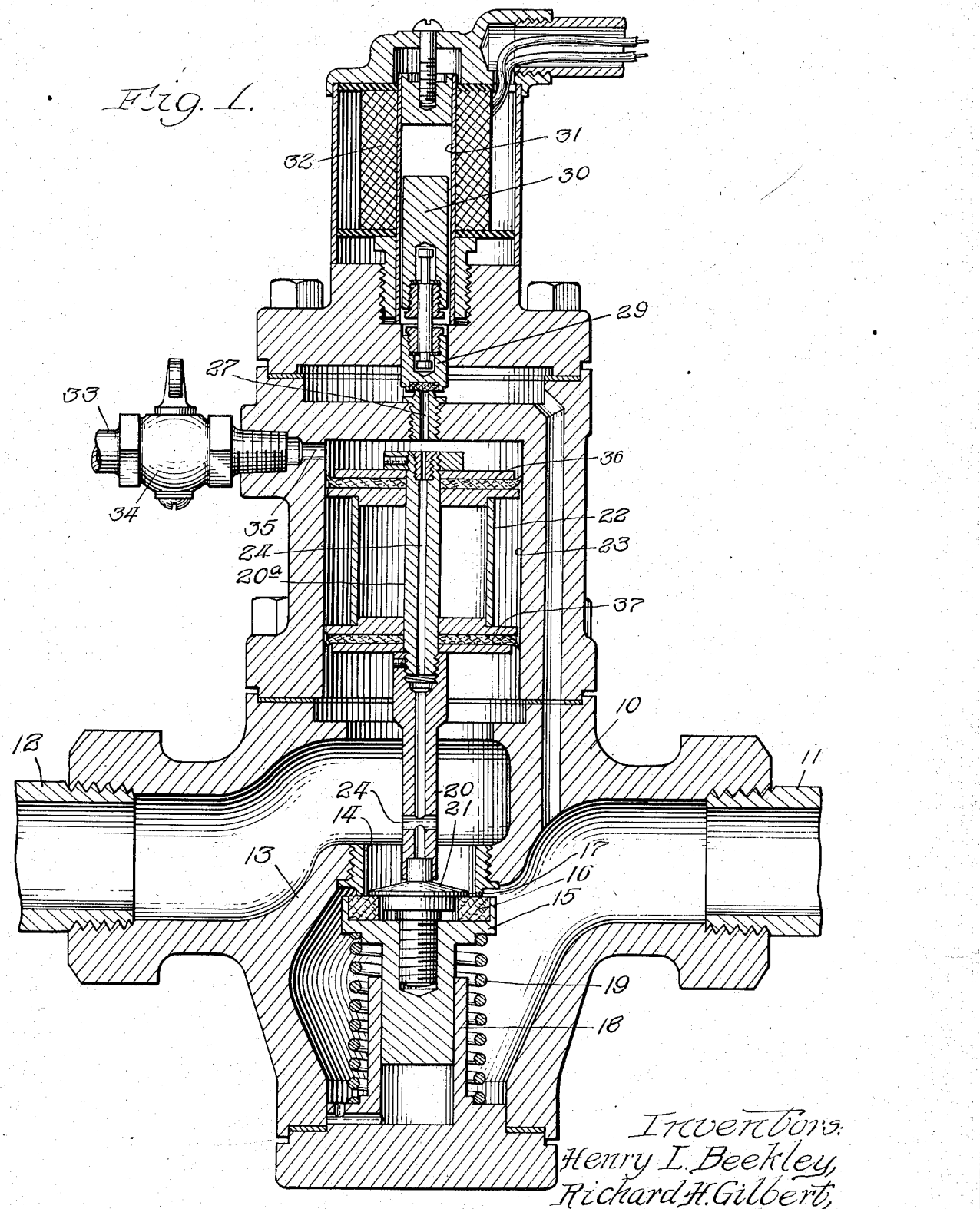
Figure 2:
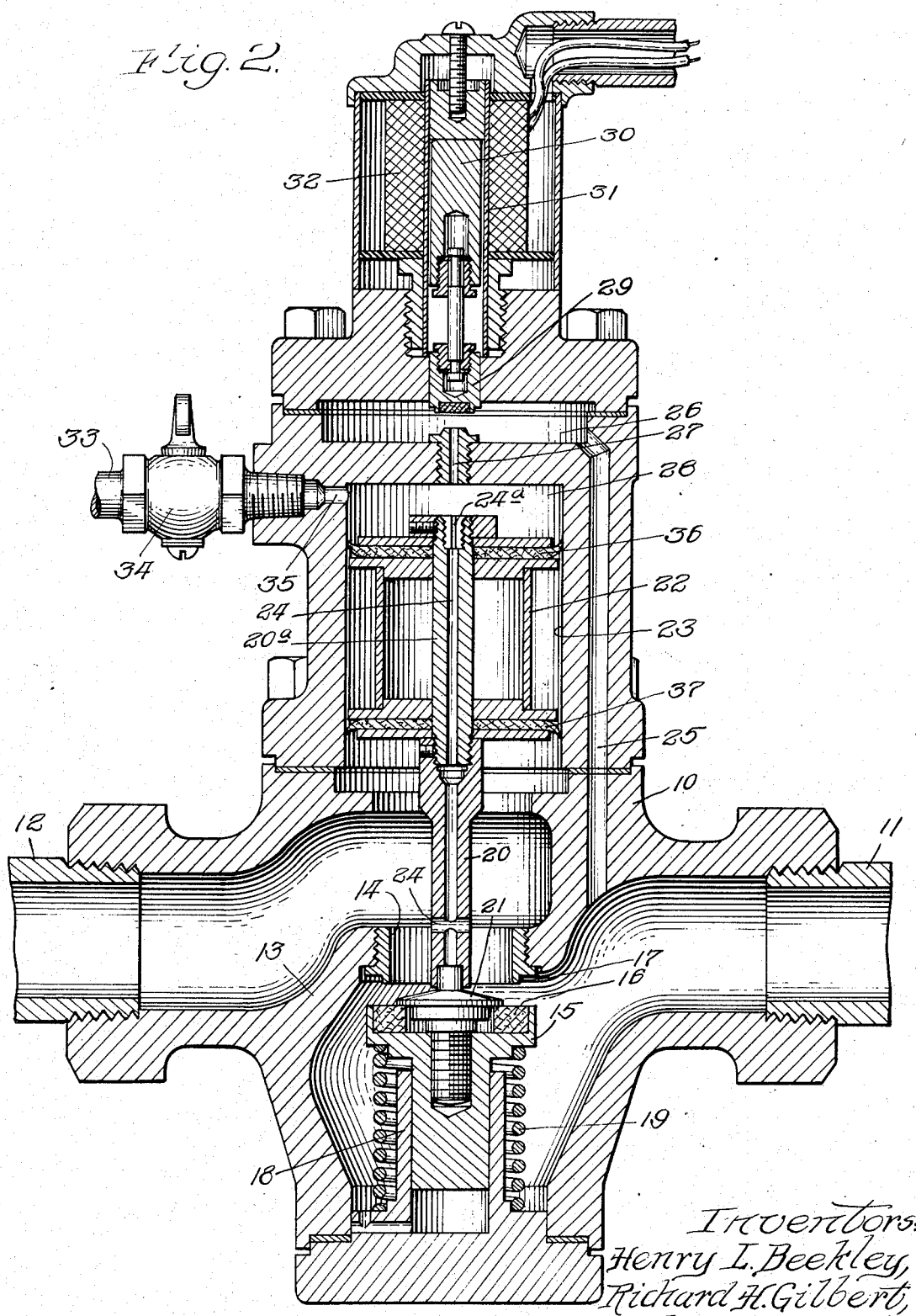

One feature of this invention is that it provides a valve designed to be automatically operated, including means for manual operation where such may be desired or necessary; another feature of this invention is that it is particularly adaptable for fire control systems using a gas such as carbon dioxide under several hundred pounds pressure; still another feature of this invention is that the position of the valve member is responsive to fluid pressure in a cylinder, this pressure being adapted to be varied by either an automatically actuated pilot valve or a manually actuated valve; other features and advantages of this invention will be apparent from the following specification and the drawings, in which:

Figure 1 is a vertical sectional view of a preferred form of our invention, with the valve member in closed position and the actuating means in corresponding position; and Figure 2 is a view of the apparatus shown in Figure 1 with the valve member in open position as the result of automatic operation of the actuating means.

There are various valve applications where fluid under very high pressure is normally prevented from flowing, and where initiation of flow is desired upon some occurrence, and it is for such use that the valves disclosed and claimed herewith have been particularly designed. One example of a place where such valves are necessary is in connection with "Cardox" fire fighting, where carbon dioxide is stored under pressures in the neighborhood of three hundred pounds to the square inch at a temperature of 0° F. It is desirable to be able to initiate the smothering flow of gas automatically as the result of a rise in temperature, or manually if the automatic operation fails or if it is desired to release the gas before the temperature responsive device has reached the critical temperature. A great deal of difficulty has heretofore been encountered with proper control of the fluid in such systems, but our valves disclosed herewith provide a relatively simple and highly efficient control arrangement.

Referring now more particularly to Figure 1, a valve casing or casting 10 is provided with an inlet and outlet, these here being shown as connected respectively to the pipes 11 and 12. It will be understood that the pipe 11 leads to some source of fluid under pressure, as for example carbon dioxide in a storage tank, and that the pipe 12 leads to some desired delivery or discharge point, as a nozzle. The inlet and outlet are separated by a partition 13 having an opening 14 therethrough, a valve member associated with this opening controlling flow therethrough. The valve member is here shown as comprising a cup member 15 and a seating member or gasket 16 adapted to engage and cooperate with an annular seat 17 around the opening 14. The valve member is movable toward and away from the opening, being here shown as guided in such movement by a tube 18, and is urged toward closed position by a spring 19. Under normal conditions the spring 19 maintains the valve member in position closing the opening 14, so that there is no flow through the valve; but both automatic and manual actuating means are provided to move the valve member to open position and initiate flow.

Turning now more particularly to this actuating means, it will be seen that a rod 20 bears at one end upon a pressure stud 21 in the valve member, being connected at its other end to an extension 20a (used for convenience of assembly) which carries a piston here identified in general as 22, this piston being slidable in a cylinder 23. The upper end of the cylinder (speaking with respect to the position of the parts in the drawings) is normally closed from communication with everything except a bleeder or discharge passage 24 through the rod members, opening at its bottom end into the space on the outlet side of the partition 13. It will thus be seen that any fluid pressure existing in the upper or closed end of the cylinder may bleed off through this passageway, so that the spring 19 may move the valve member to closed position.

Referring now more particularly to Figure 2, however, it will be seen that admission of fluid under pressure to the upper end of the cylinder causes downward movement of the piston and movement of the valve member to open position, so that flow of the carbon dioxide or other fluid takes place through the valve. A passageway 25 leads from the inlet side of the partition, where fluid under source pressure is always present, to a chamber 26 which opens through a passageway 27 to the space 28 in the top of the cylinder 23. It will be noted that the upper portion of the bleeder passage 24 has a reduced portion 24a, this being much smaller in cross section than either of the passages 25 or 27. Accordingly, whenever flow through the passage 27 is permitted fluid enters the upper part of the cylinder faster than it can leave it, and builds up a pressure above the piston which overcomes the spring 19 and moves the valve member to open position as shown in Figure 2.

The actuation shown in Figure 2 has been accomplished by movement of the pilot valve 29 which normally closes the passage 27. This valve is here shown as a vertically reciprocal plunger connected by lost motion means to a solenoid plunger 30 reciprocal within a tube 31, preferably of stainless steel, at the center of solenoid windings 32. When the solenoid is not energized, the normal condition, the parts are as shown in Figure 1 and the passage 27 is closed. When the circuit to the solenoid is completed from some remote point, as a temperature responsive thermostat or switch, its magnetic force raises the solenoid plunger and pilot valve to the position shown in Figure 2, opening the passageway 27 and building up a pressure above the piston 22 to open the valve.

Manual opening of the valve is also effected by fluid pressure operation of the piston 22. A small tube 33 is connected through a stop cock or manually operable valve 34 to an opening 35 leading into the space at the closed end of the cylinder 23. In the preferred use of our valve the tube 33 is connected to the same source of fluid under pressure to which the pipe 11 is connected, either being tapped into this pipe by a T-connection or independently carried to the source of fluid. In either event, if the automatic actuating means has failed or has not yet operated, the valve may be opened by manually opening the stop cock 34 and thus admitting fluid under pressure to the space above the piston.

We have found it to be particularly desirable, in connection with a carbon dioxide control valve, to construct a piston as shown in the drawings, where the engagement with the cylinder wall is entirely by two spaced annuli of pliant flexible material, as leather, these being here identified as 36 and 37. The annuli are appropriately clamped in place on the piston by plates provided for that purpose, and are cut with slightly larger diameter than the internal diameter of the cylinder, the edges being chamfered; that is, in released or undistorted form the edges are not square, but cut up at an angle. We have also found it to be preferable to mount these annuli on the piston with the chamfered faces opposed to each other, as may be seen. This arrangement provides a very tight seal between the piston and the cylinder wall without any possibility of sticking or jamming of the cylinder.

While we have described and claimed certain embodiments of our invention it is to be understood that it is capable of many modifications. Changes, therefore, in the construction and arrangement may be made without departing from the spirit and scope of the invention as disclosed in the appended claims.

We claim:

1. A valve of the character described adapted to control fluid under pressure and to be manually or automatically actuated, including: a valve body having an inlet and an outlet and a partition separating them, the partition having an opening therethrough; a cylinder; a piston movable in said cylinder in accordance with fluid pressure therein; a valve member carried by the piston and adapted to control flow through the opening; spring means normally maintaining the piston in a position where the valve member closes the opening; automatic means for admitting fluid under pressure to the cylinder to overcome said spring and move the valve member to open position; and manual means for admitting fluid to the cylinder to move the valve member to open position.

2. Apparatus of the character claimed in claim 1, wherein both the automatic and the manual means control delivery of fluid under pressure from the same source.

3. A valve of the character described adapted to control fluid under pressure and to be manually or automatically actuated, including: a valve body having an inlet and an outlet and a partition separating them, the partition having an opening therethrough; a cylinder; a piston movable in said cylinder in accordance with fluid pressure therein; a valve member operatively connected to the piston and adapted to be moved thereby to control flow through the opening; spring means normally maintaining the piston and valve member in a position where the valve member closes the opening; automatic means for admitting fluid under pressure to the cylinder to overcome said spring and move the valve member to open position; and manual means for admitting fluid to the cylinder to move the valve member to open position.

HENRY L. BEEKLEY.
RICHARD H. GILBERT.
ROLLIN H. LACART.